United States Patent [19]

Fields

[11] 4,434,328
[45] Feb. 28, 1984

[54] REMOTELY ACTUATED TELEPHONE INSTRUMENT CONNECTION BLOCK HAVING INSTRUMENT LOCKOUT FEATURE

[76] Inventor: Gary C. Fields, 3825 Delmont Ave., Oakland, Calif. 94605

[21] Appl. No.: 390,404

[22] Filed: Jun. 21, 1982

[51] Int. Cl.³ .............................................. H04M 3/16
[52] U.S. Cl. .............................. 179/20; 179/175.3 R; 361/191; 361/155
[58] Field of Search .......... 179/175.3 R, 2 A, 2 AM, 179/2 C, 2 DP, 5 R, 5 P, 19, 20, 18 DA, 27 G, 179/18 AB, 175.2 R, 175.2 C, 175.3 F, 175.1 R; 361/194, 191, 155; 335/167, 110, 104

[56] References Cited

U.S. PATENT DOCUMENTS

| | | | |
|---|---|---|---|
| 3,699,265 | 10/1972 | Altenburger | 179/19 |
| 3,852,537 | 12/1974 | Vincent | 179/175.3 R |
| 4,169,220 | 9/1979 | Fields | 179/175.3 R |

Primary Examiner—Stafford D. Schreyer
Attorney, Agent, or Firm—David B. Harrison

[57] ABSTRACT

A lockout circuit improves a remotely activated loop testing connection block for disconnecting a telephone subscriber's service instrument from a telephone tip and ring line pair during a test interval. The lockout circuit includes a latching relay which is responsive to a lockout command signal only when it is sent during a remotely commanded test interval. The instrument is reconnected automatically at the beginning of a subsequent test interval.

14 Claims, 1 Drawing Figure

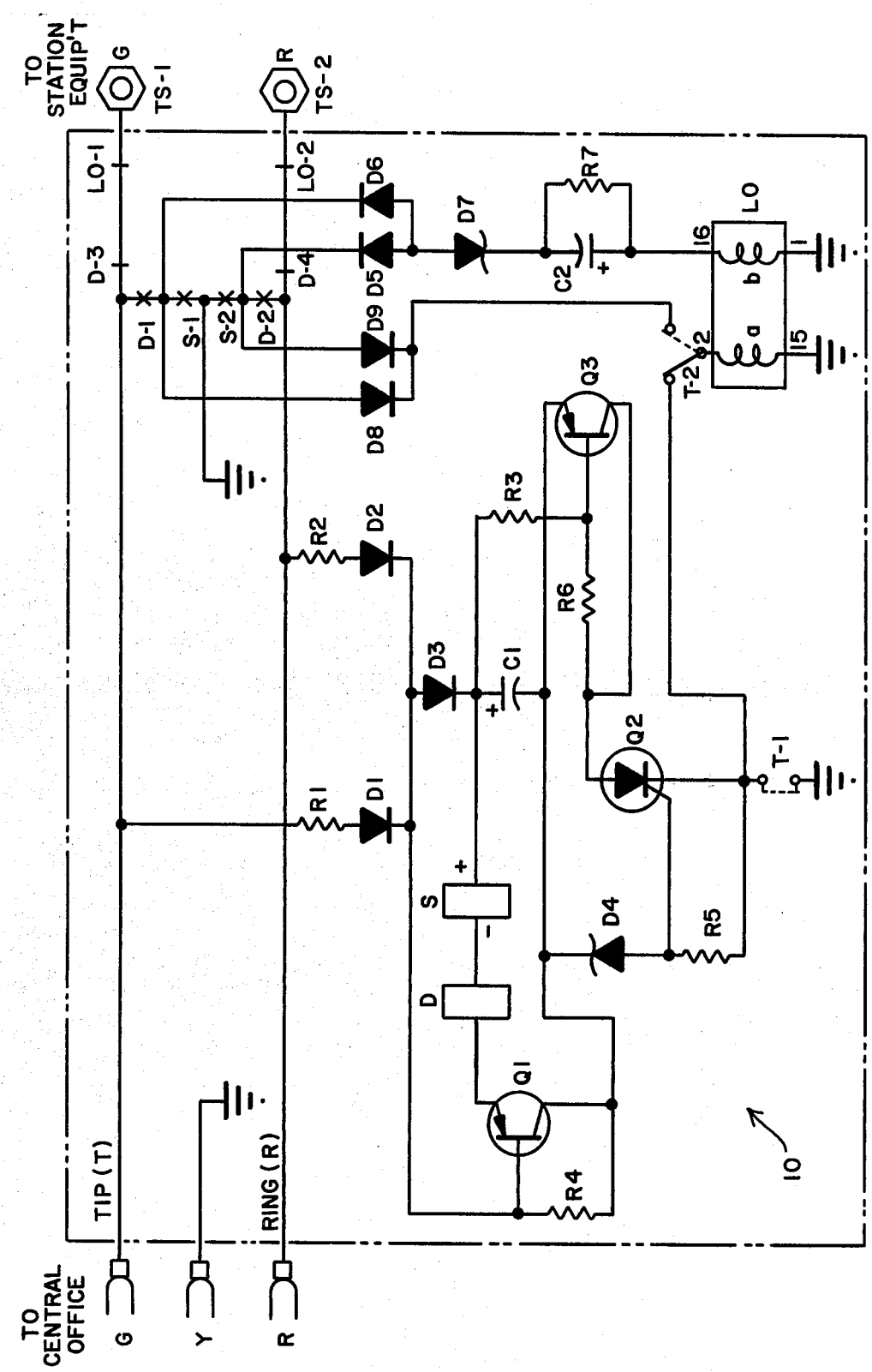

REMOTELY ACTUATED TELEPHONE INSTRUMENT CONNECTION BLOCK HAVING INSTRUMENT LOCKOUT FEATURE

BACKGROUND OF THE INVENTION

The present invention relates to an improvement in a remotely actuated telephone subscriber's service connection block. More particularly, this invention relates to a remotely actuated telephone instrument connection block having a circuit for locking out the instrument in response to a remotely sent control signal.

Telephone instrument connection blocks which provide finite test conditions and signals emulative of a field troubleshooter's tests in response from control signals sent remotely from a telephone exchange central office have been adopted on a widespread basis throughout most of the countries of the world, principally because of the labor savings such devices provide. One such block which has achieved widespread adoption and use is disclosed in my U.S. Pat. No. 4,169,220, entitled "Telphone Instrument Connection Block With Remotely Actuated Line Test". The disclosure of my said prior patent is hereby expressly incorporated by reference as part of the present disclosure.

In the use of my prior connection block it has been discovered that there are situations when the telephone company or agency may wish to disconnect a subscriber effectively from the telephone system. Usually, those situations are related to nonpayment of telephone tolls and charges, but they may be related to customer services such as disconnection during vacations or extended absences at the customer's request, so that unauthorized calls may not be made. This need has arisen in the case of vacation homes where phone service is not required or desired on a year-round basis. Another situation requiring a remote lockout arises when a subscriber's equipment may be the source of trouble or hazard to the telephone plant in place (i.e. telephone lines and central office equipment to which the lines are connected). With the increasing widespread use of customer owned and supplied telephone instruments the liklihood of incompatiblity and harm to the telephone system has increased.

Lockout devices are known in the prior art. However, the lockout devices currently known and used have an inherent drawback in that the latching circuitry which effectuates the lockout is constantly connected to the telephone tip and ring wire pair. This constant connection makes such circuits vulnerable to false operation in response to spurious, unintended signals which often become induced into the telephone system. For example, there exists a strong liklihood that a central office repair technician or cable splicer may inadvertently apply an operating potential to many lines at once, incident to repair or testing activities. With the prior art devices, they will respond to such an erroneous signal by latching out all of the customers whose lines were contacted. Consequently, those prior lockout devices constituted a potential cause of trouble and difficulty themselves. A need has arisen, therefore, for a lockout circuit which is essentially inoperative during normal line operation conditions and which becomes operative only during a test sequence.

SUMMARY OF THE INVENTION

A general object of the present invention is to improve a remotely actuated telephone subscriber's service connection block by providing it with a lockout circuit which is operative only during a test sequence thereof.

A further general object of the present invention is to provide a lockout circuit within a telephone service connection block which is effectively isolated from false or unintended actuation.

Yet another object of the present invention is to provide a remotely actuated lockout circuit within a telephone service connection block at a subscriber's location which will disconnect subscriber instruments in response to a control signal sent from a central office facility during a test interval of the connection block also remotely commanded and to keep the subscriber's instruments in a disconnected state until a subsequent test interval of the connection block is remotely commanded.

A further object of the present invention is to provide a positive lockout circuit within a telephone service connection block which is responsive to a predetermined lockout command voltage greater than normal telephone operating voltages which is sent from a central office facility during a test interval of the block which has been commanded remotely from the facility by application of an earlier sent predetermined test interval command voltage greater than normal telephone operating voltages and of opposite polarity than the lockout command voltage.

One more object of the present invention is to provide a lockout circuit within a telephone service connection block which provides an effective safeguard against unintentional actuation and which is fully integrated into the block to make use of existing control circuitry thereof in a way which provides reliability with simplicity and economy.

These and other objects, advantages and features are achieved in a remotely actuated loop testing telephone service connection block which provides a test interval during which the subscriber's instrument is temporarily disconnected from a tip and ring wire pair in response to a test interval initiation signal sent from a connected central office facility. The connection block is improved by the present invention by the inclusion therein of a lockout circuit which is responsive only to a lockout command signal sent from the central office facility during the test interval. Upon activation the lockout circuit locks out the subscriber's instrument from connection to the tip and ring wire pair until a test interval initiation signal is subsequently sent to the block from the central office. Upon detection of a subsequently sent test interval initiation signal, the lockout circuit disengages to reconnect the instrument to the tip and ring wires. Alternatively, the lockout circuit may be configured to disengage upon a lockout disengage signal sent during the test interval.

Other objects, advantages and features of the present invention will become apparent from consideration of the following detailed description of a preferred embodiment presented in conjunction with the accompanying drawing.

BRIEF DESCRIPTION OF THE DRAWING

In the drawing:

The FIGURE is a schematic circuit diagram of a telephone instrument connection block including a lockout circuit in accordance with a presently preferred embodiment of the invention. The FIGURE employs a type of notation referred to as "detached contact" in which an "X" shown intersecting a conductor represents a normally open contact of a relay and a bar shown intersecting a conductor at right angles represents a normally closed contact of a relay.

DETAILED DESCRIPTION OF A PREFERRED EMBODIMENT

A telephone instrument connection block 10 providing a remotely actuated line test function and including a remotely actuated lockout circuit includes a tip wire T and a ring wire R which extend to a remotely located central office facility. A ground connection is provided at the connection block 10 in accordance with conventional practice. The ground return provides a circuit path by which the line test conditions as well as the remote lockout function are remotely commanded from the central office.

The tip T and ring R wires extend through the connection block to terminals TS-1 and TS-2 to which the subscriber's telephone instrument is connected. The terminals TS-1 and TS-2 may be conventional, or they may be contacts of a modular jack into which a modular plug from the telephone set mates. The tip T wire is interrupted by two normally closed relay contacts D-3 and LO-1. The ring R wire is interrupted by two normally closed relay contacts D-4 and LO-2. The tip and ring wires are connected together and to ground through four normally open relay contacts D-1, D-2, S-1 and S-2.

The test condition control circuit includes two resistors R1 and R2 connected respectively to the tip and ring wires. The resistor R1 is connected to a diode D1, and the resistor R2 is connected to a diode D2. The diodes conduct when a positive voltage appears on the tip and/or ring wire relative to ground. The cathodes of the diodes D1 and D2 form a common node to which the base of a PNP transistor Q1 is connected and to which the anode of another diode D3 is connected. The cathode of the diode D3 is connected to a high storage capacity capacitor C1 and to a resistor R3 comprising a bias network with another resistor R6 for the base of a second transistor Q3.

A series circuit including the armature of a relay S, the armature of a relay D and the emitter and collector of the transistor Q1 is connected across the capacitor C1. A resistor R4 connected between the base and the collector of the transistor Q1 causes it to conduct when the voltage at the base is lower than the voltage at the emitter.

A 110 volt zener diode D4 is connected between the capacitor C1 and a control electrode of a silicon controlled rectifier Q2. A resistor R5 connected between the cathode and the control electrode of the rectifier Q2 biases it to fire when a positive voltage in excess of the zener voltage of the diode D4 is present at the capacitor C1. The anode of the SCR Q2 is connected to the collector of the transistor Q3. The emitter of the transistor Q3 is connected to the capacitor C1 and the zener D4.

The lockout circuit comprises a latching relay LO having a restore armature winding LO-a which is shown connected through a switch T between the cathode of the SCR Q2 and ground and having a lockout armature winding LO-b connected between ground and a resistor R7 - capacitor C2 parallel network. A 56 volt voltage dropping zener diode D7 is connected between the other node of the R7-C2 network and two diodes D5 and D6. The cathodes of the diodes D5 and D6 are connected respectively to common nodes between contact pairs S-1 - D-1 and S-2 - D-2.

An alternative lockout disable circuit includes two forward biased diodes D8 and D9 which are respectively connected to the D-1 - S-1 and D-2 - S-2 nodes. The cathodes thereof are commonly connected together and to a switch contact at the T-2 section of the switch T. The diodes D8 and D9 become connected to the restore armature LO-a of the lockout relay LO when the switch T is operated to ground the cathode of the SCR Q2. The switch T may be implemented as a DPDT switch, or as a pair of jumpers.

The D relay is preferably type 555A482C007, and the S relay is preferably type 555A482C006, both made by C. P. Clare Co. Division, General Instrument Corp., 3101 West Pratt Avenue, Chicago, Ill. The lockout relay LO is preferably type DS2E-ML2-DC6V made by Aromat Corp., 10400 Tantau Avenue, Cupertino, Calif.

Operation of the block 10 is as follows: When a +130 volt test signal is applied between one or both of the tip T and ring R wires and ground, a current flows through R1-D1 and/or R2-D2 and D3. The capacitor C1 begins to charge as the SCR Q2 is triggered and the transistor Q3 conducts, while the transistor Q1 is biased off. The resultant charge curve provides a unique identifying characteristic by which the central office may determine that an operational remote disconnect unit 10 is on the line. When the +130 test voltage is removed, the SCR Q2 and the transistor Q3 open, and the transistor Q1 conducts, thereby discharging the accumulated charge stored in the capacitor C1 through the armatures of the relays D and S. The relay S drops in about 10 to 15 seconds, while the relay D drops after 20 to 40 seconds, depending on the amount of charge actually stored in the capacitor C1.

By inspection it is apparent that when the S relay drops, its contacts S-1 and S-2 will open, leaving the diodes D5 and D6 connected to the ring R and tip T wires, respectively, until the D relay drops 5 to 10 seconds later. During this interval, if a −130 test voltage is applied between one or both of tip and ring and ground, that voltage will cause a current to flow through the diodes D5 and/or D6 and D7, the R7-C2 network, and the lockout armature of the relay LO. When such current flows, the relay LO opens the contacts LO-1 and LO-2, and these contacts remain open until current flows through the restore armature of the relay LO as when the +130 test voltage is subsequently applied and the SCR Q2 and transistor Q3 conduct to enable the capacitor C1 to charge once again.

The transistor Q3 and the resistors R3 and R6 limit the voltage across the capacitor C1 to a predetermined value, typically 92 volts. I have found that the Q3, R3 and R6 circuit is superior to the zener diode 56 used in my said prior U.S. Pat. No. 4,169,220. The Q3, R3 and R6 circuit enables the entire charging voltage (+130 v.) to be applied initially across the capacitor C1 until a 92 volt charge is stored therein. Thereupon, the transistor Q3 ceases to conduct. This enables the capacitor C1 to become charged faster than with the zener 56, an important consideration when the loop from the central office to the subscriber is very long and its resistance is relatively high.

The diodes D5 and D6 derive the −130 v lockout signal from the tip and ring wires T and R, while isolating the rest of the circuit. The zener diode D7 drops the voltage from −130 v to −76 v. This lower voltage then initially passes through the capacitor C2 as a current pulse to operate the lockout winding LO-b of the lockout relay LO. This pulse (charge curve) provides a second unique identifying characteristic by which the central office may determine that an operational remote disconnect unit 10 is on the line. The resistor R7 discharges the capacitor C2 when the −130 control voltage is removed, thereby resetting the disconnect enable circuitry.

An alternative lockout restore circuit is disclosed. This circuit, comprising the diodes D8 and D9 and bridging connections T-1 and T-2 is sensitive to a +130 v control voltage sent during a test interval. The effect of such a voltage is to terminate the test interval sequence, which forces the D relay to open. At the same instant a +130 volt pulse is applied to the restore armature a of the lockout relay LO, thereby restoring (disabling) the lockout relay LO.

To those skilled in the art to which this invention relates, many changes in construction and widely differing embodiments and applications of the invention will suggest themselves without departing from the spirit and scope of this invention. The disclosures and the description herein are purely illustrative and are not intended to be in any sense limiting.

I claim:

1. In a remotely activated loop testing connection block for disconnecting a telephone subscriber's service equipment from a telephone tip and ring line pair during a test interval in response to a first control signal sent from a telephone exchange, an improvement comprising a subscriber's equipment lockout circuit including switching means responsive only to a second control signal sent from said exchange during said test interval for lockingly disconnecting said equipment from said pair and thereafter for lockingly reconnecting said instrument to said pair in response to a subsequently sent restore control signal.

2. In a remotely actuated loop testing connection block for disconnecting a telephone subscriber's service equipment to a telephone tip and ring line pair from a telephone exchange and including first automatic switching means having a first predetermined operational test condition provision interval, second automatic switching means having a second predetermined operational test condition provision interval longer than said first interval for disconnecting said equipment from said tip and ring line pair, and control means for simultaneously activating said first and second switching means in response to a first control signal sent from said exchange, an improvement comprising an automatic subscriber lockout circuit, said circuit comprising third latched switching means connected for engaging to disconnect said service equipment from said tip and ring line pair only in response to a second control signal sent from said exchange during said second interval and after said first interval has elapsed, and for disengaging in response to a subsequently sent restore control signal.

3. The connection block set forth in claim 1 or 2 wherein said restore control signal comprises a subsequently sent first control signal.

4. The connection block set forth in claim 1 or 2 wherein said restore control signal comprises a first control signal which is sent during a subsequently commenced test interval.

5. In a connection block for directly connecting a subscriber's telephone equipment to a subscriber terminal end of a telephone service loop, said block providing a plurality of remotely actuated test conditions in response to the application of a predetermined test voltage greater than normal telephone operating voltages at a central office terminal end of said service loop, and said block including test voltage detection means for detecting the presence of said test voltage upon said loop and for thereupon switching said voltage to energy storage means in said block;

energy storage means connected through said test voltage detection means to said loop, for receiving and accumulating energy from said test voltage during the duration thereof;

first test condition provision means for disconnecting said subscriber's telephone equipment at said block during a test interval;

second test condition provision means for applying a test condition to said loop during a first portion of said interval; and control means connected to said test voltage detection means, said energy storage means, and said first and second test condition provision means, for connecting said energy storage means to said first and second condition provision means when said test voltage is removed from said loop, and for disconnecting said first and second condition provision means when said energy storage means becomes depleted thereby to restore normal loop conditions automatically; the improvement comprising an automatic subscriber instrument lockout circuit comprising:

latched switching means connected to said loop for lockingly disconnecting said subscriber's telephone equipment at said block during said test interval and connected to said control means for lockingly disengaging from disconnecting said subscriber's equipment in response to a subsequently sent said test voltage; and second control means connected to said loop only during said test interval and responsive after said first portion thereof to a second predetermined test voltage greater than normal telephone operating voltages and of opposite polarity to said first predetermined test voltage sent from said central office terminal end of said loop, for operating said latched switching means to cause said subscriber's instrument to become locked out of connection with said service loop.

6. The connection block set forth in claim 2 or 5 wherein said second test provision means comprises means for connecting said tip and ring wires together.

7. The connection block set forth in claim 6 where said second test provision means comprises grounding means for grounding said connected tip and ring wires to ground at said block.

8. The connection block set forth in claim 2 or 5 wherein said second test condition provision means comprises test signal generating means for generating a test signal and for applying said signal to said loop during at least a portion of said interval.

9. The connection block set forth in claim 8 wherein said test signal generating means comprises an audio tone generator for generating an audio tone as said test signal.

10. The connection block set forth in claim 8 wherein said test signal generating means comprises a digital pulse generator for generating a binary pulse string as said test signal.

11. A subscriber telephone lockout circuit within a remote test condition provision connection block connecting a subscriber telephone equipment to a telephone service tip and ring pair extending to a central office facility, said block including a pair of relays, one relay for disconnecting said instrument from said tip and ring pair and for connecting to a second relay, said second relay for connecting said tip and ring together, said block further including a control circuit having a connection between one of said tip and ring wires and ground and including a capacitor connected to store energy during an interval during which a test signal is applied remotely from said central office facility and is connected to operate said relays immediately upon cessation of said test signal to provide a test interval, said lockout circuit comprising a latching relay having contacts for disconnecting said subscriber instrument from said tip and ring and having a lockout enable winding and a lockout disable winding, said lockout disable winding being connected to said control circuit to be energized upon application of said test signal, and further comprising a second control circuit connected to one of said tip and ring wires only during said test interval and connected to energize said enable winding of said latching relay in response to a second test signal differing in polarity from said first signal received sent from said central office facility during said test interval.

12. The lockout circuit set forth in claim 11 wherein said second relay operates only during a first portion of said test interval to connect said tip and ring wires together and to ground, and wherein said second test signal is capable of being received by said second control circuit only during the remainder of said test interval following said first portion.

13. A subscriber telephone lockout circuit within a remote test condition provision connection block connecting a subscriber telephone equipment to a telephone service tip and ring pair extending to a central office facility, said block including a pair of relays, one relay for disconnecting said instrument from said tip and ring pair and for connecting to a second relay, said second relay for connecting said tip and ring together, said block further including a control circuit having a connection between one of said tip and ring wires and ground and including a capacitor connected to store energy during an interval during which a test signal is applied remotely from said central office facility and is connected to operate said relays immediately upon cessation of said test signal to provide a test interval, said lockout circuit comprising a latching relay having contacts for disconnecting said subscriber instrument from said tip and ring and having a lockout enable winding and a lockout disable winding, and further comprising a second control circuit connected to one of said tip and ring wires only during said test interval and connected to energize said enable winding of said latching relay in response to a second test signal differing in polarity from said first signal received sent from said central office facility during said test interval.

14. The lockout circuit set forth in claim 13 wherein said second relay operates only during a first portion of said test interval to connect said tip and ring wires together and to ground, wherein said second test signal is capable of being received by said second control circuit only during the remainder of said test interval following said first portion, and wherein said subsequently sent first signal is capable of being received by said third control circuit only during said remainder.

* * * * *